United States Patent [19]

Brajczewski et al.

[11] Patent Number: 5,360,952
[45] Date of Patent: Nov. 1, 1994

[54] LOCAL AREA NETWORK ELEVEATOR COMMUNICATIONS NETWORK

[75] Inventors: David C. Brajczewski, Vernon; Bertram F. Kupersmith, Avon; James P. Towey, Jr., Bristol, all of Conn.

[73] Assignee: Otis Elevator Company, Farmington, Conn.

[21] Appl. No.: 70,128

[22] Filed: Jun. 1, 1993

[51] Int. Cl.⁵ .................................... B66B 3/00
[52] U.S. Cl. ............................ 187/246; 187/277; 187/391
[58] Field of Search .............. 187/139, 101, 121, 102, 187/130; 370/99, 100.1, 101

[56] References Cited

U.S. PATENT DOCUMENTS

| | | | |
|---|---|---|---|
| 4,473,133 | 9/1984 | Enriquez et al. | 187/29 R |
| 4,530,088 | 7/1985 | Hamstra et al. | 370/110.0 |
| 4,570,220 | 2/1986 | Tetrick et al. | 364/200 |
| 4,683,989 | 8/1987 | Pillage et al. | 187/121 |
| 4,742,893 | 5/1988 | Otala et al. | 187/121 |
| 4,765,442 | 8/1988 | Blain et al. | 187/101 |
| 5,202,540 | 4/1993 | Auer et al. | 187/101 |
| 5,210,750 | 5/1993 | Nassehi et al. | 370/85.2 |

*Primary Examiner*—Steven L. Stephan
*Assistant Examiner*—Robert Nappi

[57] ABSTRACT

A LAN elevator network includes (a) a pair of redundant car buses for exchanging signals with car control system elements, (b) a pair of redundant group buses for exchanging signals with the redundant car buses by means of a car-group bridge, and (c) with a pair of redundant building buses, which exchange messages with a building controller, by means of a group-building bridge. Communication among all nodes on the car bus, group bus, and building bus occurs by means of a single protocol. Each communications element on a bus communicates with the bus by means of a communications coprocessor including a transmitter and a receiver.

1 Claim, 16 Drawing Sheets

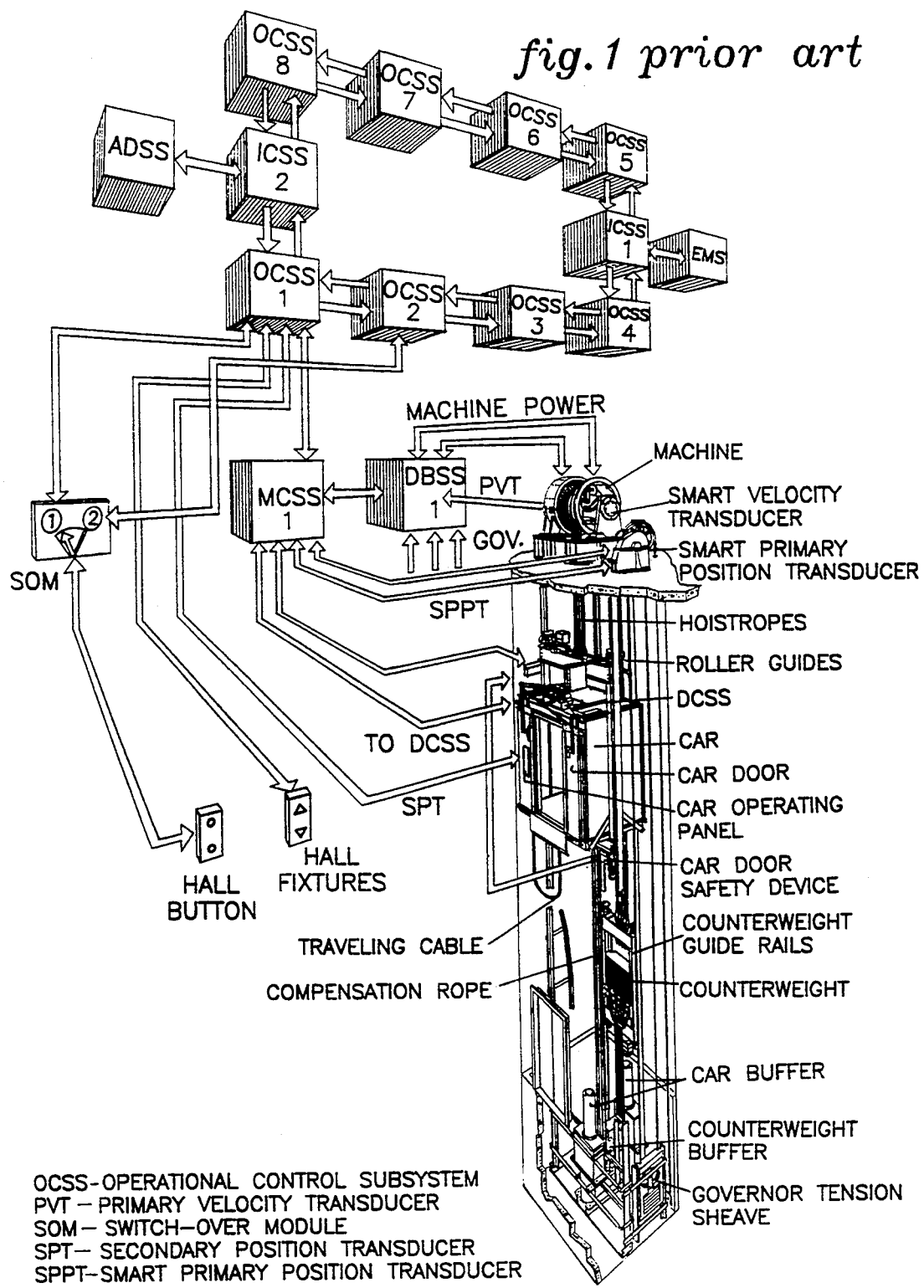

fig.1 prior art

OCSS - OPERATIONAL CONTROL SUBSYSTEM
PVT — PRIMARY VELOCITY TRANSDUCER
SOM — SWITCH-OVER MODULE
SPT — SECONDARY POSITION TRANSDUCER
SPPT - SMART PRIMARY POSITION TRANSDUCER
ADSS - ADVANCED DISPATCHING SUBSYSTEM (OPTION)
DCSS - DOOR CONTROL SUBSYSTEM
DBSS - DRIVE AND BRAKE SUBSYSTEM
EMS — ELEVATOR MANAGEMENT SYSTEM (OPTION)
ICSS - INFORMATION CONTROL SUBSYSTEM
MCSS - MOTION CONTROL SUBSYSTEM

| MID | FUNCTION | SOURCE | CB |
|---|---|---|---|
| 2 | DISPATCH HALL CALL | OCSS | 6 |
| 3 | ANSWER HALL CALL | OCSS | 3 |

| PRE-AMBLE | SENDER ID | CB | MID | LA | BA | DATA | CRC | POST-AMBLE | FRAME GAP | PRIORITY SLOTS | ROTATE SLOTS |
|---|---|---|---|---|---|---|---|---|---|---|---|

FIG.4

| COMMUNICATION MODE | CB BIT SETTINGS 3 2 1 0 | PACKET FORMAT |
|---|---|---|
| NODE TO NODE (LOCAL BUS) | 1 0 0 0 | CB/MID/LA/DATA/CRC |
| NODE TO NODE (REMOTE BUS) | 1 1 0 0 | CB/MID/LA/BA/DATA/CRC |
| NODE TO BUS (LOCAL BUS) | 0 0 0 0 | CB/MID/DATA/CRC |
| NODE TO BUS (REMOTE BUS) | 0 1 0 0 | CB/MID/BA/DATA/CRC |
| NODE TO CAR BUS SET (LOCAL) | 0 1 0 0 | CB/MID/BA/DATA/CRC |
| NODE TO CAR BUS SET (REMOTE) | 0 1 0 0 | CB/MID/BA/DATA/CRC |
| NODE TO GROUP BUS SET | 0 1 0 1 | CB/MID/BA/DATA/CRC |
| NODE TO SYSTEM | 0 1 0 0 | CB/MID/BA/DATA/CRC |
| NODE TO BUILDING BUS SET | 0 1 0 1 | CB/MID/BA/DATA/CRC |

DEFINITIONS:

LOCAL BUS — THE BUS ON WHICH THE TRANSMITTING NODE IS PHYSICALLY LOCATED.

REMOTE BUS — BUS SEPARATE FROM BUS ON WHICH ACTIVE NODE IS DIRECTLY CONNECTED (ie. CAR VERSUS GROUP BUS). REMOTE BUSES TYPICALLY SEPARATED BY A BRIDGE.

CAR BUS SET — ALL CAR BUSES AND ASSOCIATED GROUP BUS IN AN ELEVATOR GROUP.

GROUP BUS SET — ALL CAR BUSES AND ASSOCIATED GROUP BUS AND BUILDING BUS IN AN ELEVATOR GROUP.

BUILDING BUS SET — ELEVATOR GROUP BUS AND BUILDING BUS.

FIG.6

BUS ADDRESS

| CBA | | GBA | |
|---|---|---|---|
| 0 | NONE | 0 | BLDG BUS |
| 1 | CAR BUS 1 | 1 | GROUP BUS 1 |
| 2 | CAR BUS 2 | 2 | GROUP BUS 2 |
| . | . | . | . |
| . | . | . | . |
| . | . | . | . |
| 10 | CAR BUS 10 | 10 | GROUP BUS 10 |
| 11 | UNUSED | 11 | UNUSED |
| 12 | UNUSED | 12 | UNUSED |
| 13 | UNUSED | 13 | UNUSED |
| 14 | UNUSED | 14 | UNUSED |
| 15 | ALL CAR BUSES | 15 | ALL GROUP BUSES |

FIG.8

CAR BUS

| NODE | LOCAL ADDRESS |
|---|---|
| CAR/GROUP BUS CONTROLLER | 0 |
| OCSS | 1 |
| MCSS | 2 |
| DCSS | 3 |
| DBSS | 4 |
| CAR ELD | 5 |
| HALL ELD'S (64 TOTAL*) | 6-70 |
| UNUSED | 71-255 |

*CURRENT OCSS SERVICES A MAXIMUM OF 64 FLOORS.

GROUP BUS

| NODE | LOCAL ADDRESS |
|---|---|
| GROUP/BUILDING BUS CONTROLLER | 0 |
| CAR/GROUP BUS CONTROLLER | 1-10 |
| ADS1 | 13 |
| ADS2 | 14 |
| EMS MACHINE ROOM INTERFACE | 15 |
| UNUSED | 16-255 |

BUILDING BUS

| NODE | LOCAL ADDRESS |
|---|---|
| GROUP/BUILDING BUS CONTROLLER | 1-1 |
| EMS | 11 |
| SEC | 12 |
| REM | 13 |
| UNUSED | 0,14-255 |

FIG.9

CONDITIONS REQUIRED FOR PACKET ACCEPTANCE AT A NODE:

| NODE TYPE | | | | CB BYTE VALUE | | | | PACKET DECODE RESULTS* | | | | COMMENTS |
|---|---|---|---|---|---|---|---|---|---|---|---|---|
| C-G UP | G-C DWN | G-B UP | B-G DWN | BA** | LA** | C-G COPY | G-B COPY | GBA MATCH | CBA MATCH | LA MATCH | MID MATCH | |
| X | X | X | X | 0 | 0 | X | X | X | X | X | 1 | GENERIC NODE  ⎫ |
| X | X | X | X | 0 | 1 | X | X | X | X | X | 1 | GENERIC NODE  ⎬ A–D |
| X | X | X | X | 1 | 0 | X | X | 1 | 1 | X | 1 | GENERIC NODE  ⎬ |
| X | X | X | X | 1 | 1 | X | X | 1 | 1 | 1 | 1 | GENERIC NODE  ⎭ |
| 1 | 0 | 0 | 0 | 1 | X | X | X | 0 | X | X | X | BRIDGE: CAR–GROUP UP, E |
| 1 | 0 | 0 | 0 | X | X | 1 | X | X | X | X | X | BRIDGE: CAR–GROUP UP, F |
| 0 | 1 | 0 | 0 | 1 | X | X | X | 1 | 1 | X | X | BRIDGE: GROUP–CAR DOWN, G |
| 0 | 0 | 1 | 0 | 1 | X | X | X | 0 | X | X | X | BRIDGE: GROUP–BUILDING UP, H |
| 0 | 0 | 1 | 0 | X | X | X | 1 | X | X | X | X | BRIDGE: GROUP–BUILDING UP, I |
| 0 | 0 | 0 | 1 | 1 | X | X | X | 1 | X | X | X | BRIDGE: BUILDING–GROUP DOWN, J |

\* 1 – INDICATES A MATCH OCCURED  
0 – INDICATES NO MATCH OCCURED  
X – INDICATES DON'T CARE CONDITION  
\*\* 1 – INDICATES THAT THIS FIELD IS PRESENT IN THE PACKET

FIG.18

LOCAL AREA NETWORK ELEVEATOR COMMUNICATIONS NETWORK

TECHNICAL FIELD

The present invention relates to an elevator communications network.

BACKGROUND OF THE INVENTION

In an elevator system similar to that described in co-pending allowed application Ser. No. 07/029,495, entitled "Two-Way Ring Communication System for Elevator Group Control" (filed Mar. 23, 1987), the disclosure of which is incorporated herein by reference, elevator group control may be distributed among separate microprocessors, one per car in the group. These microprocessors, known as operational control subsystems (OCSS), are all connected together in a two-way ring network. Each OCSS has a number of other subsystems and signaling devices, etc., associated with it, as will be described more fully below; only one such collection of subsystems and signaling devices is illustrated in FIG. 1 for the sake of simplicity.

The hall buttons and lights are connected with remote stations and remote serial communication links to the OCSS via a switch-over module. The car buttons, light, and switches are connected through similar remote stations and serial links to the OCSS. The car specific hall features, such as car direction and position indicators, are connected through remote stations and remote serial link to the OCSS.

The car load measurement is periodically read by the door control subsystem (DCSS), which is part of the car controller. This load is sent to the motion control subsystem (MCSS), which is also part of the car controller. This load in turn is sent to the OCSS. DCSS and MCSS are microprocessors controlling door operation and car motion under the control of the OCSS, with the MCSS working in conjunction with the drive and brake subsystem (DBSS).

The dispatching function is executed by the OCSS, under the control of an advanced dispatcher subsystem (ADSS), which communicates with the OCSS via an information control subsystem (ICSS). The car load measured may be converted into boarding and deboarding passenger counts using the average weight of a passenger by the MCSS and sent to the OCSS. The OCSS sends this data to the ADSS via ICSS.

The ADSS through signal processing inter alia collects the passenger boarding and deboarding counts at the various floors and car arrival and departure counts, so that in accordance with its programming, it can analyze the traffic conditions at each floor. The ADSS can also collect other data for use in making predictions, etc., if so desired.

This ring system has problems.

Communication between each node in the system is point-to-point, i.e. from, for example, the drive control to the motion control or from the motion control to the operational control. Nodes are any communications element on a bus. If it is desired to move a message from the drive control to the operational control, the message must take two transmissions-one transmission from the drive control to the motion control and a second transmission from the motion control to the operational control. Because communication is point-to-point, the time required for communication is increased; the message must pass through many communication nodes, be decoded, interpreted, and encoded at each node along the message route. For the same reason, the communications computing requires complicated, expensive, and redundant software.

Second, this communication system requires that an applications microprocessor associated with a node perform communications functions in addition to the application functions for which the host microprocessor was designed, for example, in the case of the drive and brake subsystem, directing movement of the machine and sheave and brake. Therefore, the microprocessors, such as the DBSS, do not perform their applications as well as they might.

Third, it is difficult to add a node to the system; doing so requires each node in the communications path between the transmitting node and the receiving node to be loaded with the hardware and software for transmitting and receiving messages from the transmitting node, even though this intermediary node is not going to use that message. For example, if EMS wants to send a message to ADSS, then ICSS 1 and each OCSS within the communications path, as well as ICSS 2, must be retrofitted with the hardware and software for handling an EMS message. This need for retrofitting each intermediary node with the hardware and software for a message is more pernicious when not only is this particular message not meant for the intermediary transceiver node (for example OCSS), but none of the messages from the transmitting node (for example, EMS) are ever used by the intermediary node for performing its main function.

DISCLOSURE OF THE INVENTION

An object of the present invention is to reduce average time for communication of a message between nodes in a local area network (LAN) elevator communications network.

According to the present invention, a LAN elevator network includes (a) a pair of redundant car buses for exchanging signals with car control system elements, (b) a pair of redundant group buses for exchanging signals with the redundant car buses by means of a car-group bridge, with (c) a pair of redundant building buses, which exchange messages with a building controller, by means of a group-building bridge.

In further accord with the present invention, communication among all nodes on the car bus, group bus, and building bus occurs by means of a single protocol.

In still further accord with the present invention, each communications element on a bus communicates with the bus by means of a communications coprocessor including a transmitter and a receiver which coprocessor performs communications functions only if a host microprocessor connected to a bus need not denote processing time to communicate functions.

Advantages of the present invention are:

(a) reduced message communication time because a message passes through fewer nodes in being transmitted through the communications system;

(b) host processors within elevator control elements are free to do more computing in their function as hosts because they are not also required to function as communications processors;

(c) addition of nodes involves merely connection of a node to a bus, which serves all nodes common to it without the need for reconfiguring intermediate nodes;

and (d) point-to-point communications capability for any node in the communications system.

BRIEF DESCRIPTION OF THE DRAWINGS

FIG. 1 is a prior art figure of a ring network for an elevator system;

FIG. 4 is a timing diagram of the message protocol;

FIG. 6 is a table of the modes of communication of the present invention;

FIG. 8 is a table of address assignments for the local address field; and

FIG. 9 is a table of address assignments for a bus address field.

FIG. 18 is a table listing the conditions for acceptance of a packet by the receive machine.

BEST MODE FOR CARRYING OUT THE INVENTION

Figure 2:
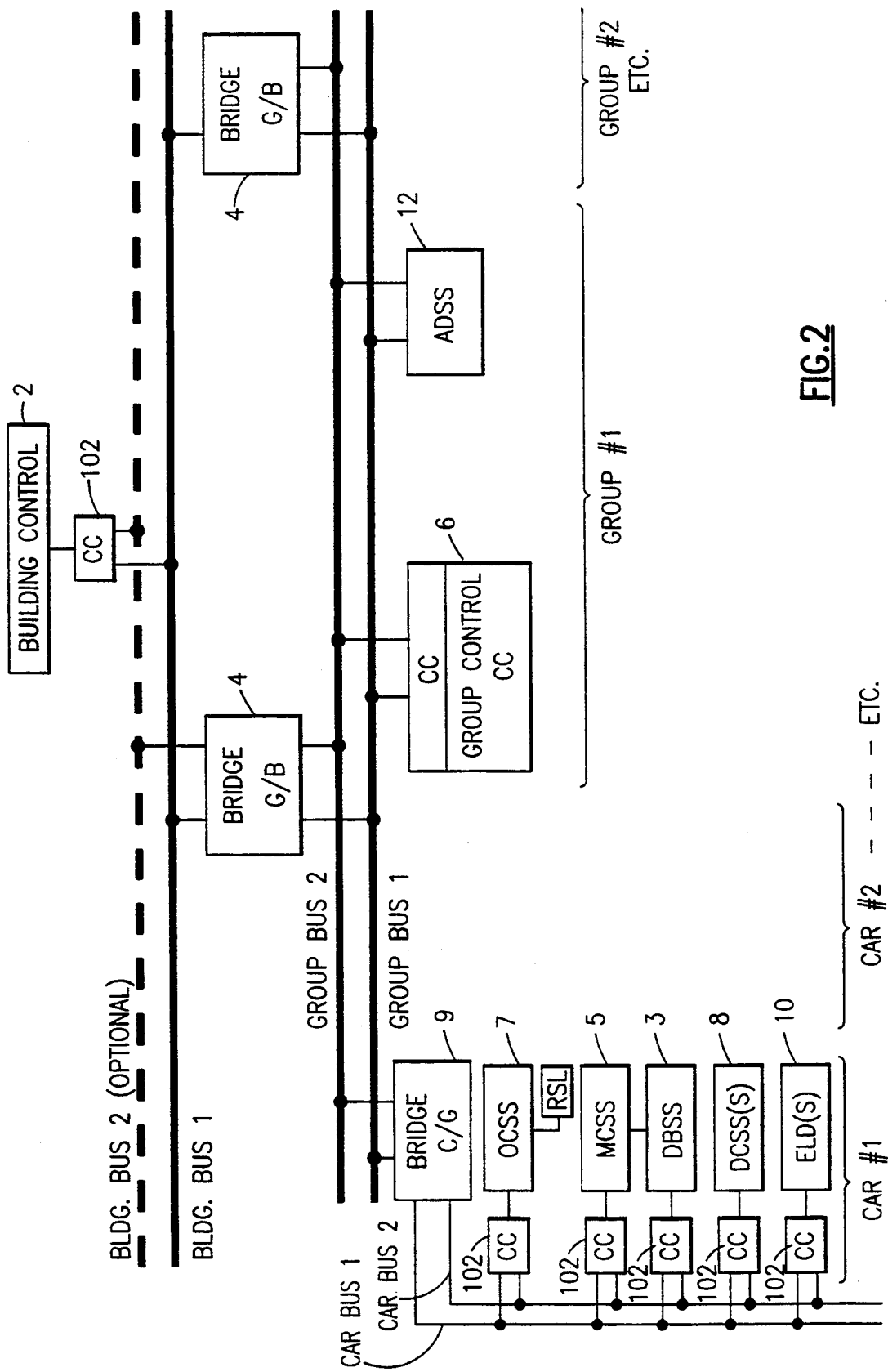
FIG. 2 is a block diagram of the local area network elevator system of the present invention.

FIG. 2 shows two redundant building buses (building bus 1, 2), two redundant group buses (group bus 1, 2), and two redundant car buses (car bus 1, 2).

Ideally, the same information travels on each bus of every pair of redundant buses. For example, the signals on building bus 2 are the same as the signals on building bus 1.

Connected to building buses 1 and 2 through a communications coprocessor (CC) 102 is a building control 2 for coordinating the dispatching of groups of elevators (as opposed to coordinating dispatching of elevators within a group) and for elevator diagnostic purposes. A bridge 4 connects the group (G) buses to the building (B) buses (i.e., G/B). Connected to the group buses 1, 2 through a CC is a group controller 6 for dispatching a first group of elevators, building control 2, and a car-to-group bridge 9. Connected to the car buses 1, 2 through a CC 102 are a number of car control systems, an operational control subsystem (OCSS) 7, a motion control subsystem (MCSS) 5, a drive and brake subsystem (DBSS) 3, a door control subsystem (DCSS) 8, and an electro-luminescent display (ELD) 10. The OCSS 7 exchanges signals with a remote serial link in the same way as signals are exchanged in U.S. Pat. No. 4,497,391 "Modular Operational Elevator Control System" to Mendelsohn et al incorporated herein.

Elevator car buttons, lights, and switches (not shown) are coupled through remote serial links (RSL) to the OCSS 7. Elevator car specific hall features, such as car direction and position indicators (not shown), are coupled through RSL to the OCSS 7. These specific car features include ELD 10 comprised of an alphanumeric display device and a lobby Hall Lantern (HL) (not shown).

Each elevator car (not shown) associated OCSS 7 has a similar arrangement of indicators, switches, communication links and the like, as just described, associated therewith.

Car load measurement is periodically read by DCSS 8. The load measurement is sent to MCSS 5. The load measurement in turn is sent to the OCSS 7. DCSS 8 and MCSS 5 are preferably embodied within microprocessors for controlling the car door operation and the car motion, under the control of the OCSS 7. The MCSS 5 also works in conjunction with a drive and brake subsystem (DBSS) 3.

A car dispatching function is executed by the OCSS 7 in conjunction with an advanced dispatcher subsystem (ADSS) 12, which communicates with each OCSS 7. By example, the measured car load is converted into boarding and deboarding passenger counts by the MCSS 5 and sent to the OCSS 7. The OCSS 7 subsequently transmits this data over the communication buses. Also by example, data from a hardware sensor mounted on the car's door frame may sense boarding traffic, and this sensed information is provided to the car's OCSS 7.

The ADSS 12 may also collect data on individual car and group demands throughout the day to arrive at a historical record of traffic demands for different time intervals for each day of the week. The ADSS 12 may also compare a predicted demand to an actual demand so as to adjust elevator car dispatching sequences to obtain an optimum level of group and individual car performance. Various aspects of this functionality are described in commonly assigned U.S. Pat. No. 5,024,295, issued Jun. 19, 1991, entitled "Relative System Response Elevator Dispatcher System using Artificial Intelligence to Vary Bonuses and Penalties" to Kandasamy Thangavelu, the disclosure of which is incorporated herein in its entirety.

Each bridge 4, 9 accepts a message and passes it on to the next bus in response to a control byte signal, a local address signal, a message identifier signal, and a bus address signal contained within a message.

Figures 3, 7:
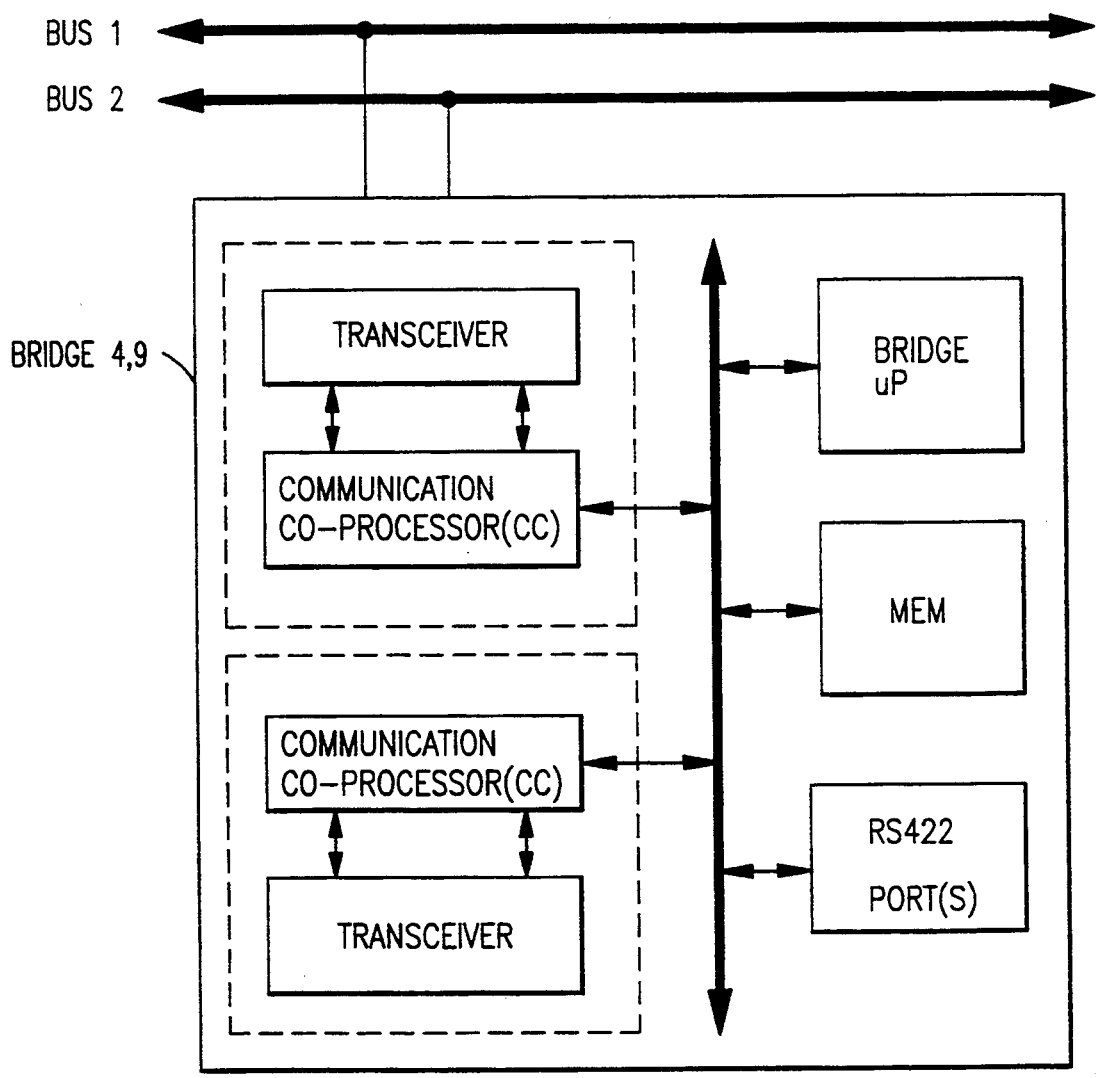
FIG. 3 is a block diagram of a bus bridge.
FIG. 7 is a partial message IDentifier table.

FIG. 3 shows a bus bridge 4, 9 connected to redundant buses 1, 2 which may be building buses, group buses, or car buses. The bridge 4, 9 includes two CCs, two transceivers (one for each bus pair), a bridge microprocessor (P) for interfacing with memory (MEM), and an RS422 port for interfacing to, e.g., an OCSS.

FIG. 4 shows a protocol communicated between nodes on a busy as opposed to an idle bus. Where nodes are attempting bus access to an idle bus, those nodes jam the bus first as described in co-pending Ser. No. 07/992,877 entitled "Implicit Token Media Access Protocol without Collision Detection" incorporated herein by reference. The protocol begins with a four-bit preamble for indicating the start of the protocol. The preamble is followed by an eight-bit sender IDentifier (ID) for allowing a receiver to identify the source of a message and particularly for indicating to a receiving node a rotating slot currently being used by a transmitting node. The sender ID field consists of a five-bit identification (ID) code and three bits for error checking/correcting- The sender ID of each CC is programmable and pre-assigned. Sender IDs must be unique by bus segment. In other words, identical sender IDs may be used in the LAN, but not on the same bus.

Figure 5:
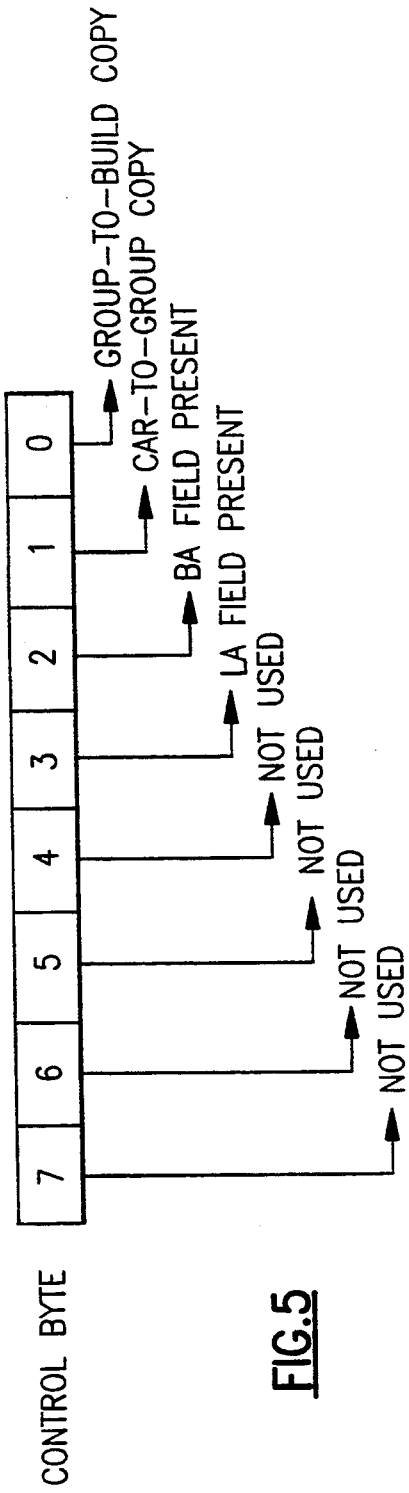
FIG. 5 a timing diagram of a control byte.

The sender ID is followed by an eight-bit control byte. The last four bits indicate the length of a data field (1-16 bytes) which is the message itself. The format of the control byte is shown in FIG. 5. The zeroth bit indicates whether the data in the message packet will be copied from the group bus to the building bus. The first bit of the control byte indicates whether the data in the message will be copied from the car bus to the group bus. These two bits are for use by a CC in a bridge. The second bit indicates whether a bus address (BA) field is present. The bus address is used for node to bus addressing. The third bit indicates whether a local address (LA) field is present. The local address is for node-to-node addressing, to reduce the average time for communication of a message between nodes. The control byte indicates message format by indicating whether the local address and/or bus address is present. The control byte indicates the communication mode because the first four bits tell where the message will go.

FIG. 6 shows the communication modes indicated by control byte bit settings. The communication mode of the message is node-to-node and restricted to a local bus, when the setting of the first four bits is "1000" because the local address field is used in the message. Communication between a node with another node located on a remote bus is indicated by a control byte bit setting of "1100" because both the local address and bus address fields are present in the packet format of the message. Communication between a node and a local bus is indicated by a control byte bit setting of "0000". Neither the local address field nor the bus address field is needed for node to local bus communication. When the mode of communication is between a node and a remote bus, the control byte bit setting is "0100". This bit setting requires a bus address field for the communication between a node and a remote bus. For communication between a node and a local car bus set to the node, the control byte bit setting is "0100". The bus address field is indicated by this bit setting, but the particular bus to which the communication is made is always given by the bus address. Communication between a node and a remote car bus set is indicated by a control byte bit setting of "0100." Communication between a node and a group bus set is indicated by a control byte bit setting of "0101". A control byte bit setting of "0100" identifies communication between a node and all nodes. A control byte bit setting of "0101" indicates communication between a node and a building bus set.

Each CC includes a message IDentifier (ID) table of message IDentifiers (MID) that it will accept. The MID field is used by a CC as well as the host, for example, the door drive, to determine the message content and whether the message will be accepted by the application layer. FIG. 7 shows a partial MID table for an OCSS along with a message function associated with that MID, the source of the message, and a control byte (CB) value associated with that specific MID value. In general, CBs and MIDs are independent and the same MID could be sent to a different destination, either to a bus via the BA or to a specific single node via the LA and BA. The CB would indicate the type of addressing used.

Where the MID is 2, the control byte is "6", and the message source is an OCSS. Possible destinations of the message are local car buses, the group bus, and the building bus. Possible node destinations are the OCSSs and ADSS for the group of that source OCSS. The message is used to dispatch a hall call (both initial dispatching of a hall call and subsequent redispatching) by initiating the OCSS. This message will be generated by the source OCSS on an event/constant time interval (hall call button operation/redispatch interval expiration). The message consists of an 8-bit car address, a 7-bit hall call landing number, a 3-bit hall call type, a 14-bit RSR signal, and 2-bit car call flags. The hall call type may have eight values:
(a) "00" front up hall call
(b) "01" front down hall call
(c) "02" rear up hall call
(d) "03" rear down hall call
(e) "04" front emergency hall call
(f) "05" rear emergency hall call
(g) "06" front car call
(h) "07" rear car call Where the MID is 3, the control byte has a value of "3" and destinations may be the car buses, the group bus, or the building bus. Possible node destinations may be OCSSs or ADSS. This message is sent out in response to the dispatch (and subsequent redispatch) message sent out by the initiating OCSS. This message is generated by the source OCSS on an event, namely, reception of a dispatch message sent out by an initiating OCSS. The message consists of a 4-bit local car address, a 7-bit hall call landing number, a 3-bit hall call type, a 14-bit RSR signal, and 2-bit car call flags. RSR is described in U.S. Pat. No. 4,363,391 "Relative System Response Elevator Call Assignments" which is incorporated herein.

As above, each node on the communications system contains an MID table so that the CC may determine whether or not it wants to accept the message. Particular messages are acceptable only to particular nodes. In the above MIDs regarding the OCSS, for example, MCSS is not a possible destination and the CC of the MCSS would not accept any of the messages having MIDs 1-3.

The MID and local address are used by all nodes to accept and process messages if (a) addressed to their local address or (b) the MID of the message matches one in their MID table.

Two exceptions to these two rules concern velocity-/acceleration messages and drive state messages. The reason is that since these messages can take up more than 50% of the bandwidth, these messages are optimized to consist only of the preamble, control byte, message length, and check sum. Bus address and local address are not included. Consequently, all receiving nodes must look at the control byte to make the decision to accept/reject these two messages. Nodes may not look at the MID to determine whether to accept or reject a message nor may they look at the bus address or the local address to determine whether to accept or reject these two messages because none of those fields is included in a message having velocity/acceleration or drive state.

The bus address and local address fields are used only when communication is required between specific nodes or a node and a bus. The bus address and local address fields are used to steer the message packet to its proper destination.

The local address field is eight bits wide and may be used for node-to-node addressing. The local addresses for the nodes on the three buses are shown in FIG. 8.

An eight-bit bus address field may be used for node-to-bus addressing. The bus address field is used to direct a message to a specific bus or set of buses. The bus address field is also used by bridges in determining if a message should be passed on to the next level bus. The bus address field is divided into two four-bit nibbles. The upper nibble is defined as the car bus address (CBA). The lower nibble is defined as the group bus address (GBA). FIG. 9 shows the address assignments for the bus address field. If the value of the upper nibble is zero, the message is sent to the building bus. If the value of the upper nibble is 1-14, the message is sent to specific group buses or nowhere. If the value of the upper nibble is 15, the message is sent to all the buses. If the value of the lower nibble is zero, the message is not sent to any car bus address. If the value of the lower nibble is 1-14, the message is sent to one of the various car buses, or not sent anywhere. If the value of the lower nibble is 15, the message is sent to all car buses. A car bus address of none is used as a blocking address at the bridges. That is, a packet intended for a bus other than a car bus having a bus address field should set the car bus address field to none. All nodes on the building and group buses have car bus addresses of "none". Next in the message is a 16-byte data field followed by a 16-bit checksum which in turn is followed by a postamble. A frame gap follows the postamble for allowing the bus to electrically settle prior to transmission of another message. Fixed and priority slots assign bus access to the next node.

The use of the term "layer" fairly comports with the layers of the ISO communication standard discussed in *Computer Networks* by Tanenbaum, 2d ed., (1989) pages 208-212.

Figure 10A:
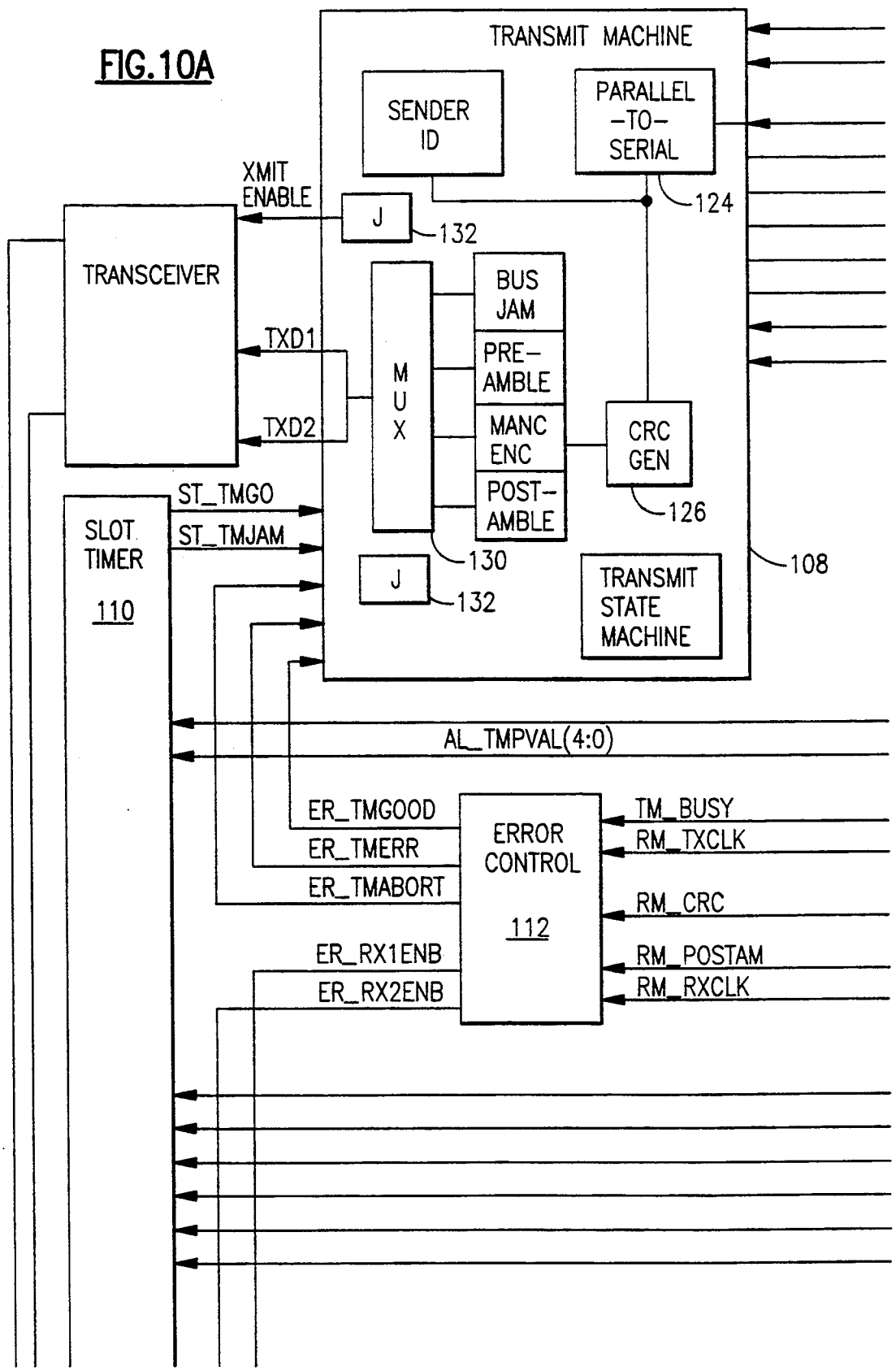
FIG. 10 is a block diagram of a communications coprocessor (CC) for transmitting and receiving the protocol of FIG. 4.
Figure 10B:
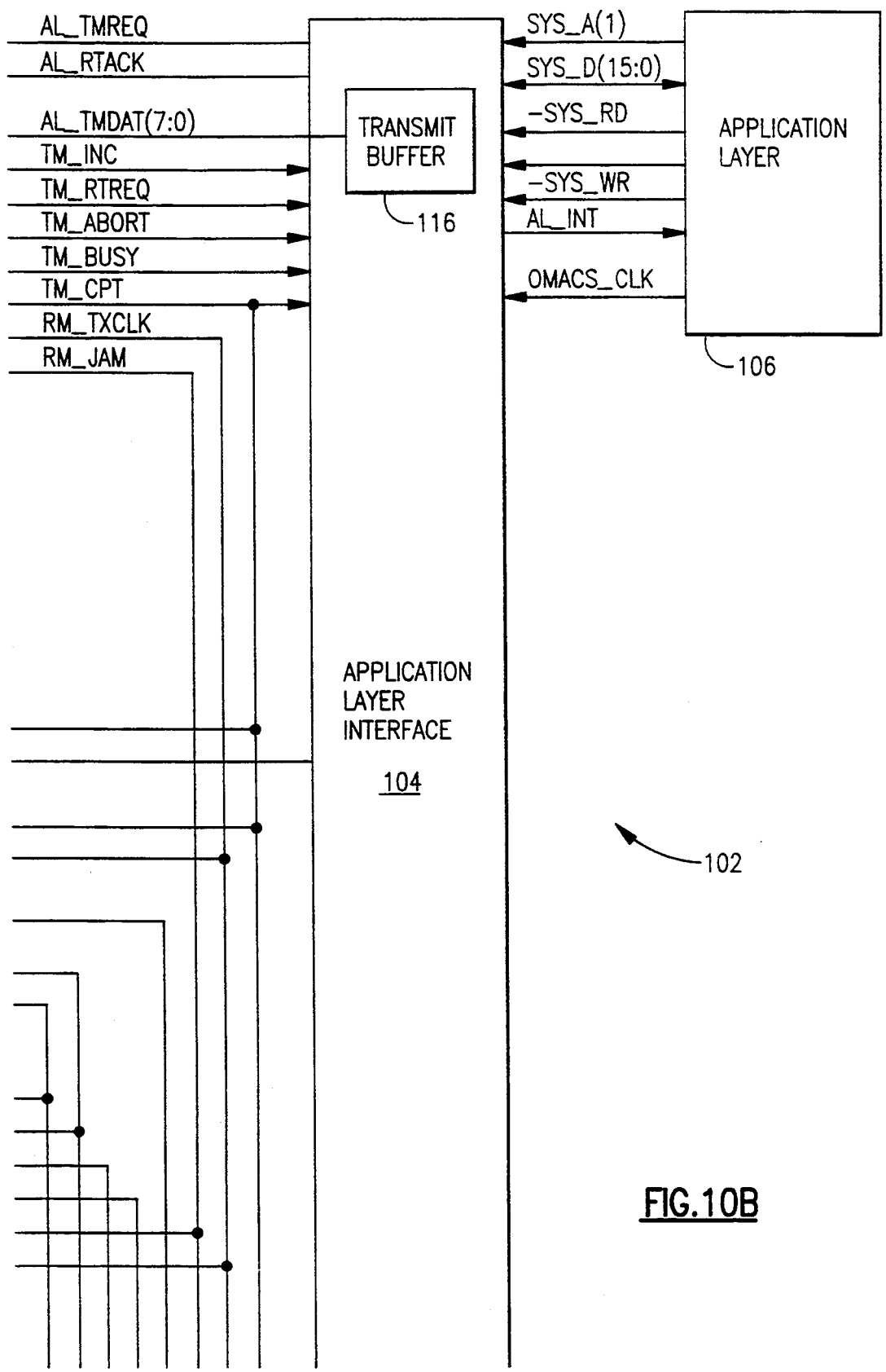
Figures 10, 10C:
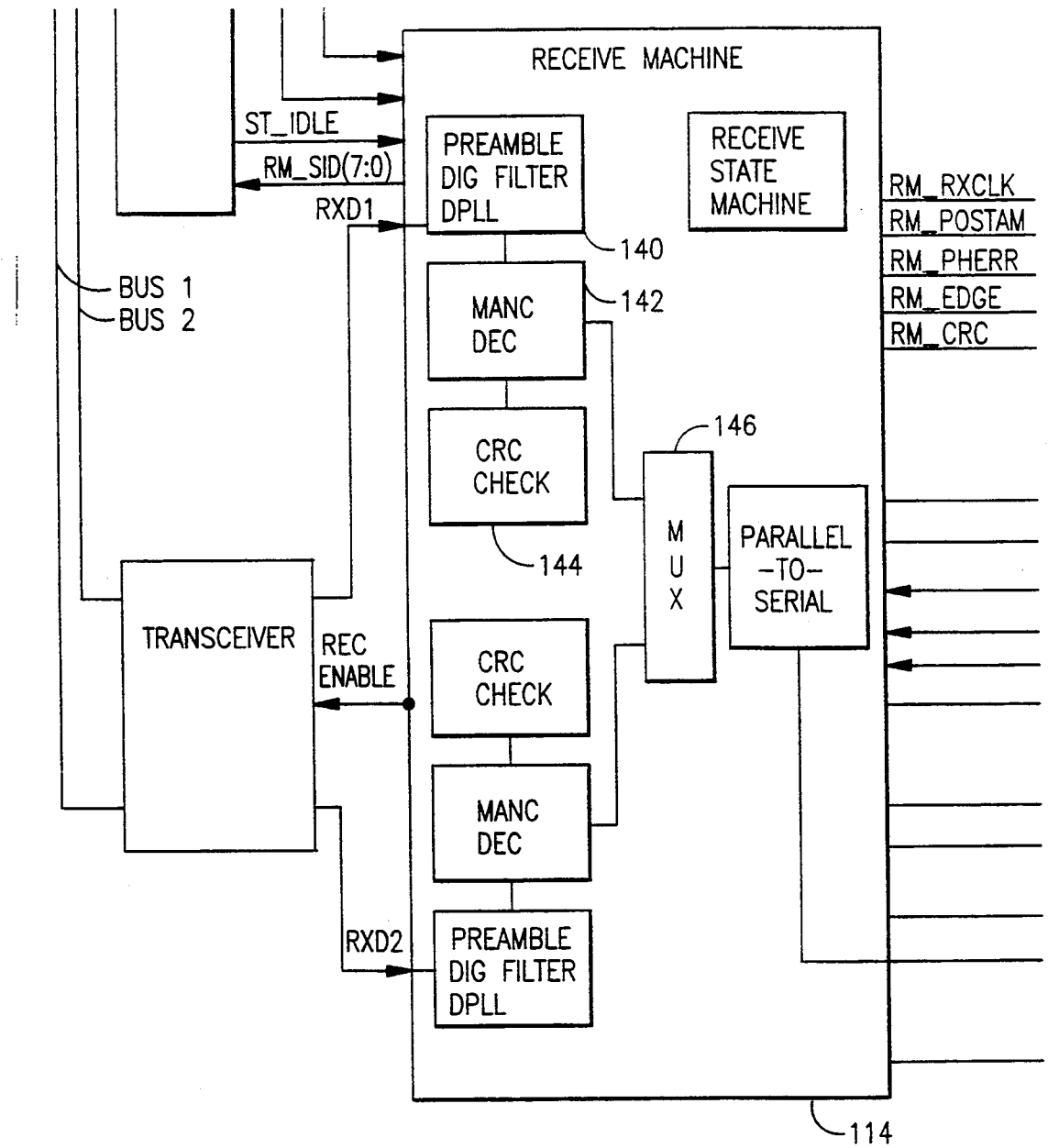
Figure 10D:
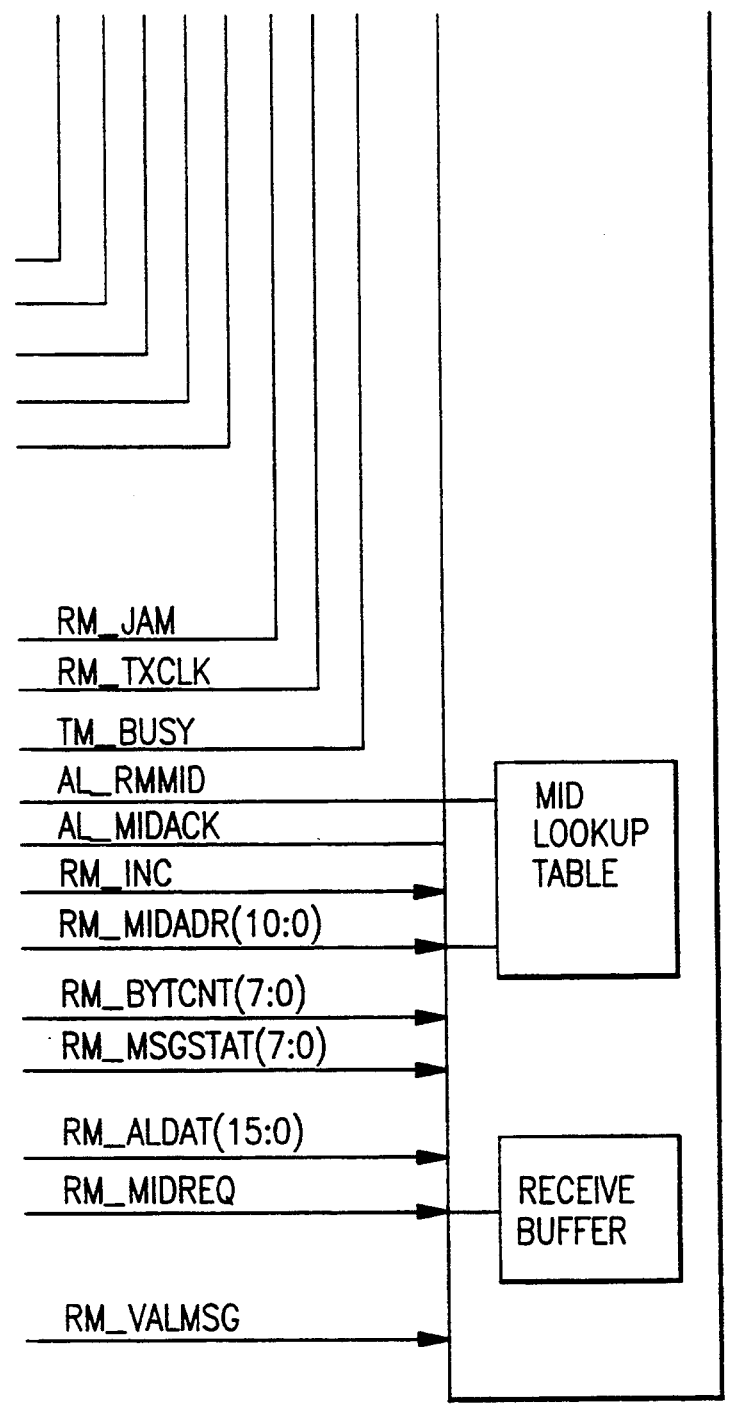

FIG. 10 shows a CC 102 for transmitting and receiving a message. The CC 102 includes (a) an applications layer interface (ALI) 104 for interfacing the CC 102 and an applications layer (AL) 106, (b) a transmit machine (TM) 108 for receiving messages from the ALI 104 and transmitting them onto a bus (Bus 1 or Bus 2), (c) a slot timer (ST) 110 for indicating to the TM 108 that (i) a current time slot on the bus (Bus 1 or Bus 2) for transmitting messages is the one assigned to it and that (ii) the bus is being used, and (d) an error control (EC) 112 for (i) tracking errors or (ii) reporting errors, and (e) a receive machine (RM) 114 for receiving messages and passing these on to the ALI 104 which sends them to the AL 106. The AL 106, for example, includes a signal host processor for an elevator motion or drive control.

Message transmission proceeds generally as follows. First, the ALI 104 sends an application layer interrupt signal AL_INT to the AL 106, signaling that the ALI 104 is available to be written into. Next, the AL 106 writes the message into the ALI 104 by means of the address, data and write signals SYS_A, SYS$_{13}$ D, and SYS$_{13}$WR. Third, a transmit-buffer-loaded signal within the 16-bit SYS_D (15:0) signal tells the ALI 104 that the AL 106 has loaded a message into a transmit buffer (TB) 116 of the ALI 104. Fourth, the ALI 104 sends a transmission request signal AL_TMREQ to the TM 108 for telling the TM 108 that the TB 116 has a message. Fifth, if the TM 108 is not busy, indicated when a signal TM_BUSY from the TM 108 is not set, the TB 116 loads the TM 108 with a data signal AL_TMDAT including the message, a control byte, data, an MID data signal, and LA and BA fields. The TM 108 provides an increment signal TM_INC to the ALI 104 to get each new byte of the message in the TB 116. After the message exits the TB 116, it is converted to serial form in a parallel to serial converter in the TM 108. Sixth, the message is transmitted redundantly on two buses (Bus 1, Bus 2) by means of signals TXD1, TXD2 (TX is a common abbreviation for transmitting, transmit or transmission). Seventh, when the transmission is complete, the TM 108 provides a transmit complete signal TM_CPT to the ALI 104 and to the EC 112. The invention is explained in more detail below.

The AL 106 may not delete data in the TB 116 while the transmission is taking place, that is, while the TM_BUSY signal is being provided from the TM 108.

The AL 106 sends, within the SYS_D (15:0) signal to the ALI 104, (a) a priority level signal for indicating priority level of the message and (b) a priority signal for indicating that the message includes a priority message. If the ALI 104 has not received the interrupt signal ALI_INT for a long time and the AL 106 has a priority message, the AL 106 may flush data in the TB 116, in order to replace it with the priority message, by means of a flush bit within the SYS_D signal. The priority level signal is passed on as the signal AL_TMPVAL to the ST 110.

Whether a message is transmitted depends on two and ST_TMGO. ST_TMJAM tells the TM 108 that the bus is idle and that a jam signal must precede a transmission onto the bus (Bus 1 or 2). ST_TMGO tells the TM 108 that the current slot is the slot assigned to it and therefore the bus is available to it. If the TM 108 receives ST_TMGO and a message is stored in the ALI 104, the TM 108 will transmit a message signal TXD1, TXD2 onto the bus. While the TM 108 is transmitting, the TM 108 sets high TM_BUSY to indicate to the ALI 104, ST 110, EC 112, and RM 114 that the TM 108 is busy.

If the TM 108 learns from the ST 110 that the bus is idle, transmission of a message is preceded by transmission of a bus jam signal as the header for TXD1, 2. The bus jam signal drives the bus from a high impedance state to a low impedance state for a minimum of two-bit times and then back to a high impedance state. The bus jam signal is provided when the ST 110 does not receive for a given time: (i) an RM_EDGE signal from the RM 114 for indicating edges in the received signal, (ii) a postamble signal RM_POSTAM from the RM 114, and (iii) an RM_JAM signal from the RM 114 when the network is jamming all these, indicating that the bus is idle.

Figure 11:
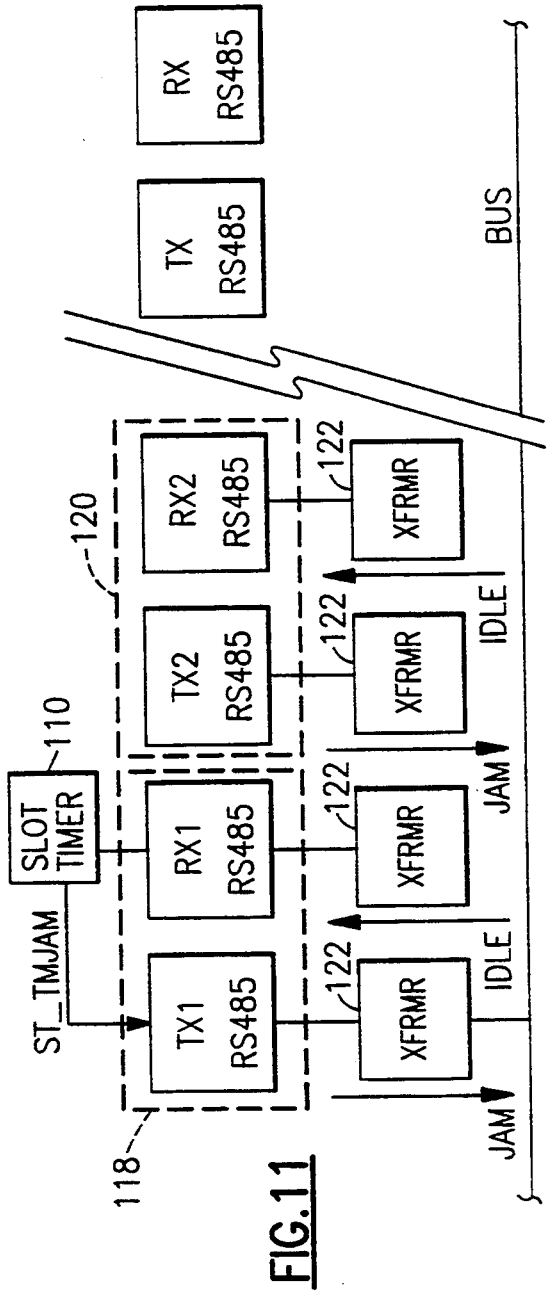
FIG. 11 is a block diagram of RS485 drivers and receivers when a jam signal is put on the bus.
Figure 12:
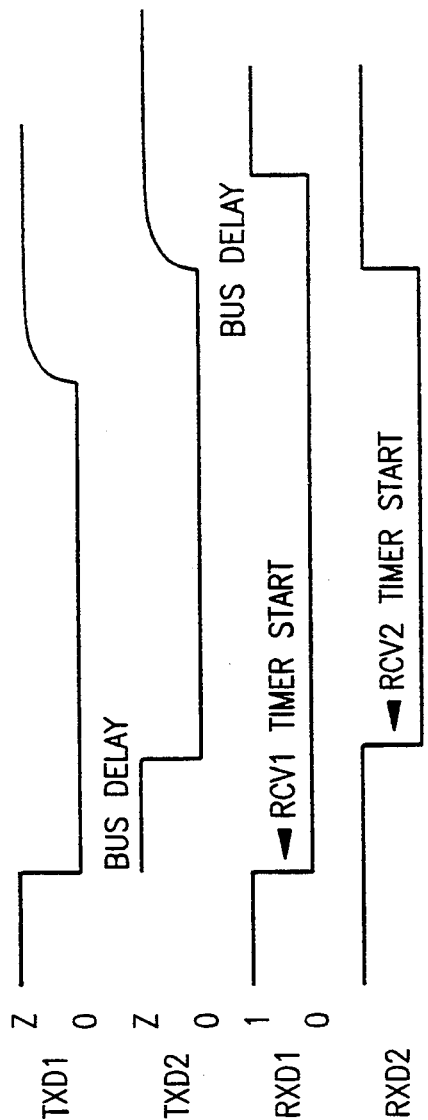
FIG. 12 is a timing diagram of signals transmitted and received by the RS485 drivers and receivers of FIG. 2.
Figure 13:
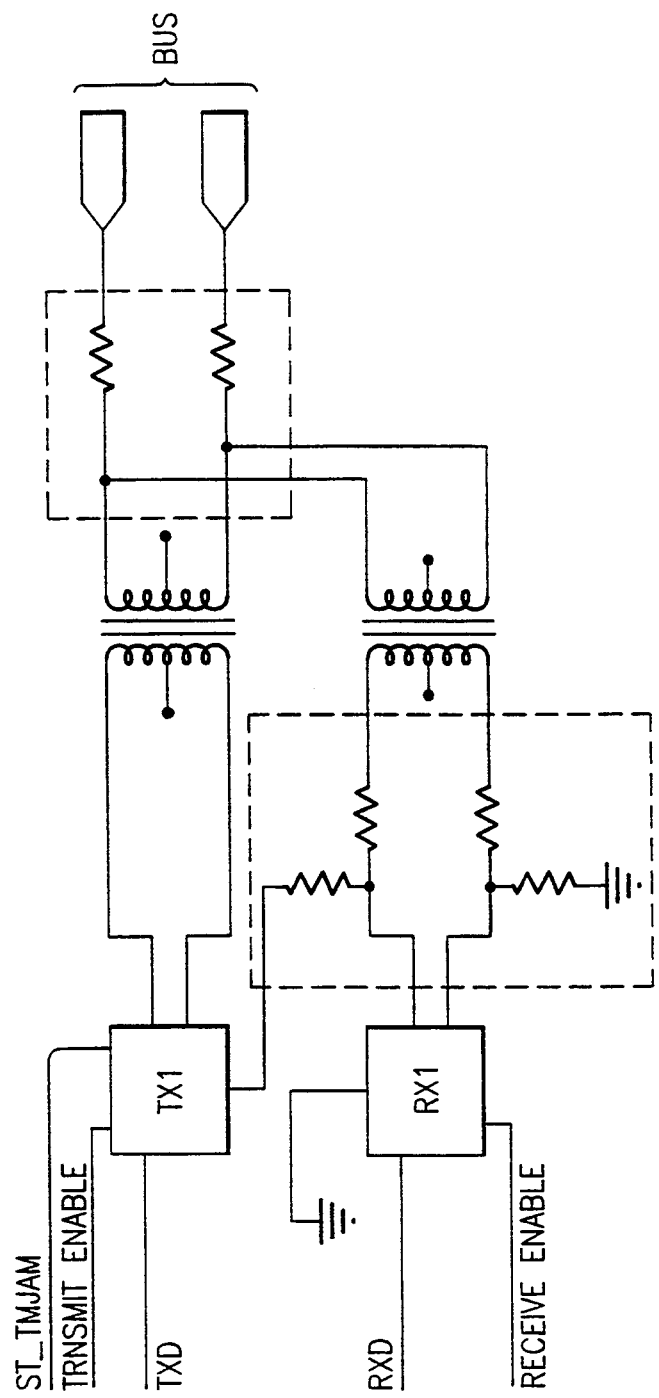
FIG. 13 is a circuit of a transceiver including an RS485 driver and an RS485 receiver for connection to a CC.

FIGS. 11-13 describe bus jamming. FIG. 11 shows two transmitter/receiver pairs TX1/RX1 118, TX2/RX2 120 (RX is a common abbreviation for receiving or receive) when a jam signal is being put on the bus. TX (1 or 2) corresponds to TM 108 and RX (1 or 2) corresponds to RM 114. Each transmitter TX is an RS485 line driver according to the known Electronic Industries Association (EIA) standard; similarly, each RM 114 is an RS485 receive machine in accordance with the EIA standard. When the first receive machine RX1 detects that bus 1, 2 is idle, the first transmitter TX1 jams the bus prior to sending a message. If the second receive machine RX2 detects a jam prior to the second transmitter TX2, providing a second jam signal onto the bus, receive machine RX2 prevents the second transmitter TX2 from jamming the bus. If, however, the second receive machine RX2 does not detect a bus jam prior to the second transmitter TX2 jazzming the bus, then the second transmitter TX2 jams the bus. The first receive machine RX1 and transmitter TX1 and second receive machine RX2 and transmitter TX2 are all transformer-coupled to the bus. The transformer (XFRMR) 122 minimizes the direct current common mode voltage provided to the RS485 from the bus.

FIG. 12 shows the outputs TXD1, 2 of the transmitters TX1, TX2 while the previously idle bus is being jammed and the inputs RXD1, 2 while the bus is being jammed. FIG. 12 shows TX1 jamming the bus as described above by driving a negative voltage onto the bus, which is in a high impedance state when idle. If transmitter TX2 jams the bus before receive machine RX2 receives the bus jam signal from transmitter TX1 (one bus delay after TX1 jams), then the RS485 drivers are not damaged because according to the invention, they drive the bus in the same direction, rather than opposite directions. This avoids the need for thermal protection circuitry. If TX1, 2 drive the bus in opposite directions, for example, TX1 jammed low and TX2 jammed high, TX1 and TX2 might be damaged without thermal protection circuitry.

Each CC 102 is synchronized within a propagation delay when, on receipt of the first jam signal, all receive machines RX transition from high to low in response to the first jam signal and remain in the low state even when they receive a second bus jam signal.

FIG. 13 shows TX1 and RX1 and accompanying circuitry. When the RS485 TX1 receives a transmit enable signal, ST_TMJAM, a bus jam signal is provided. Through a fault isolation circuit, this bus jam signal drives low the voltage across the bus lines which is normally high when the bus is idle. This low voltage is detected at the inputs to the receiving RS485 RX1. The result is that the output from the RM 114, which is high when the bus is idle, becomes low.

Returning to FIG. 10, when the message goes from a parallel to serial converter 124, a preamble is prepended to the message (after a bus jam, if one is provided). The preamble is provided when the TM 108 receives the ST_TMGO signal from the ST 110, indicating that the slot assigned to this node is the current slot. The preamble is four-bit times long and consists of a signal low in the first half of the first bit and high in the second half of the second bit, low in the second bit, low in the first half of the third bit, and high during the second half of the third bit and the fourth bit. The preamble is used by receive machines to delimit the start of a message and to establish bit synchronization within a message.

As the message is being converted from parallel to serial form, the message, except for the preamble and a frame postamble, is passed through a cyclic redundancy check generator 126 where a check sum is appended to the message. The CRC-16 cyclic redundancy code will be used $(X^{16}+X^{15}+X^2+1)$, where X is a generator polynomial as described in Tanenbaum, *Computer Networks*, 2d ed. (1989), pages 208–212.

In FIG. 10, the message is Manchester encoded as it is being transmitted. In this coding scheme, the first half of a bit cell contains the complementary data and the second half contains the true data. The transition is guaranteed in the middle of each bit cell, providing for self-clocking. Every bit cell is also 50% high and 50% low, providing a DC component when averaged over several bit times, making Manchester encoding compatible with transformer coupling.

A frame postamble is appended 128 to the check sum portion of the message; the postamble is a logical one broadcast for two-bit times used by RM 114 to delimit the end of a message.

In FIG. 10, a multiplexer (MUX) 130 combines the bus jam, preamble, and message (including sender ID, control byte, MID, LA, BA, CRC byte) and postamble for transmitting them onto buses 1, 2.

While the message is being transmitted, a jabber detect circuit 132 measures the duration of the message. The jabber detect circuit 132 is a timer which is started when it receives TM_BUSY. The jabber detect circuit 132 is responsive to a CG_JAB count signal, a time-out period which represents an interval greater than the longest possible message. An attempt by the TM 108 to maintain control of the media for a time greater than the jabber detect time-out period is prohibited by the jabber detect circuit 132, causing an abort signal, TM_ABORT, to be provided to the transmit state machine (TSM) for commanding abortion of a transmission.

Finally, the message TXD1, 2 is provided from the CC 102 to a transceiver (e.g., TX1/RX1 of FIG. 13). Following transmission, the TM 108 sets low TM_BUSY and clears TM_CPT (the message indicating that the transmission is complete), TM_RTREQ (a message indicating to the TB 116 that a retransmission is requested), TM_ABORT, AL_RTACK (an acknowledgment signal from the AL 106 that a retransmission request has been received from the TM 108), ER_TMABORT (a signal from the error control for informing the TM 108 that transmission is to be aborted because the number of retransmissions requested exceeds the number allowed) and ER_TMERR (a signal for indicating that an error in transmission has occurred).

After transmission, the TM 108 receives one of three signals from the EC 112: a transmission good signal ER_TMGOOD, a transmission error signal ER_TMERR, and an abort signal ER_TMABORT. If the number of retransmit errors has exceeded a limit, the TM 108 sets TM_ABORT, TM_CPT, and clears the request signal AL_TMREQ from the TB 12 to the TM 108. If, however, the transmission is good, the abort signal TM_ABORT is not set and the error bit ER_TMERR is not set either, so transmission is complete and the TM 108 sets TM_CPT and AL_TMREQ is cleared. If the error bit ER_TMERR is set, (a) the TM 108 sets TM_RTREQ for requesting a retransmission of the message, (b) the ALI 104 responds by setting AL_RTACK acknowledging the transmit request, and (c) the ALI 104 sets AL_TMREQ for requesting the TM 108 to receive the message from the TB 116 and transmission occurs as described above. Setting of AL_TMREQ on retransmission can be cleared; however, for example in cases where a priority message being transmitted is more important than retransmission of the present message.

In FIG. 10, the RM 114 is responsive to messages RXD1, 2 from buses 1, 2 connected to the transceiver of FIG. 4. There are three synchronization signals received by the CC 102. The bus jam signal synchronizes all CCs. Following the bus jam comes a preamble 140 which starts a digital phase locked loop (DPLL) 140 in the RM 114 and thereby synchronizes the data to a clock (CLK) (not shown) internal to the CC 102. Third, by the use of Manchester encoding, each bit within the data signal includes a clock signal RMRXCLK at the one-half bit mark which is kept in synch with the clock (CLK).

Within the RM 114, each message RXD1, 2 from each bus 1, 2 is digitally filtered in Block 140. Second, the message is provided to a preamble detect circuit in Block 140.

From the preamble detect circuit in Block 140, the message is provided to the DPLL 140 for sampling at the center of each half-bit of the Manchester encoded message. The message is Manchester (MANC) decoded 142 as it is received and provided to a CRC checker 144. The CRC checker 144 is enabled after the preamble and disabled before the postamble. A CRC error signal RM_CRC is provided to the EC 112 for indicating transmission errors.

A MUX 146 receives the two messages from bus 1 and bus 2 and, based on the preamble detected, selects one of the two buses.

Figure 14:
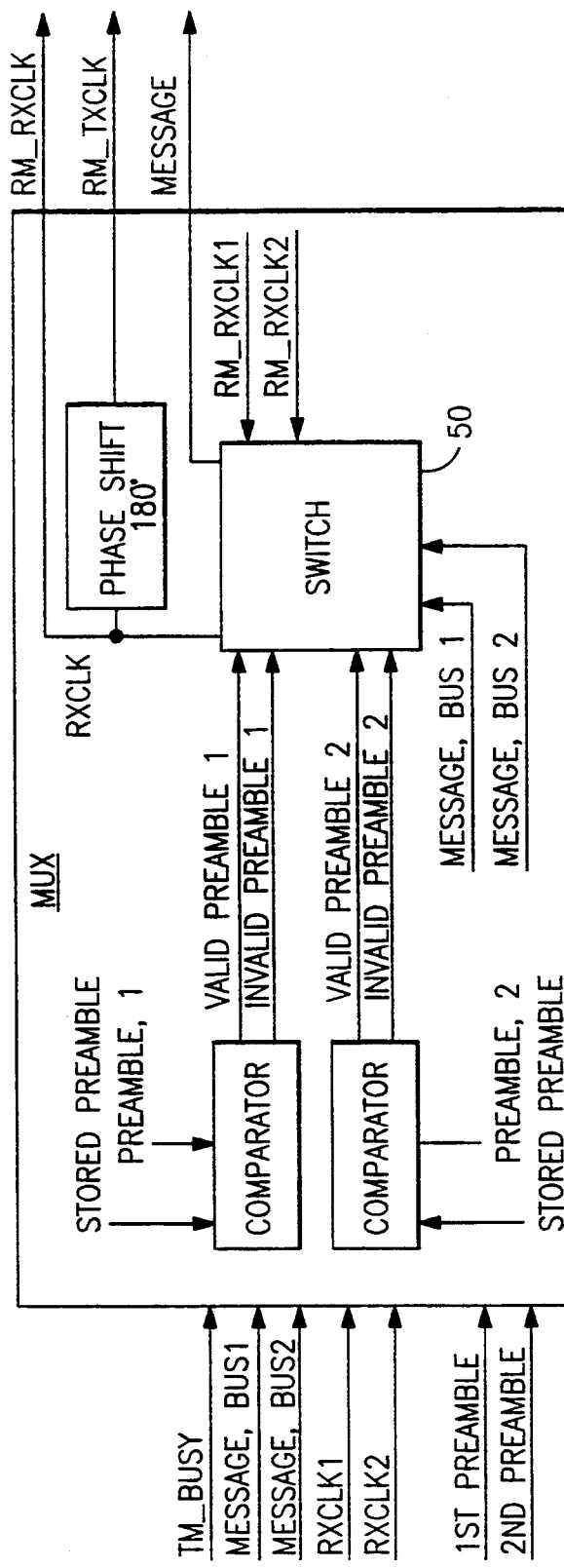
FIG. 14 is a block diagram of a multiplexer.

Beginning with the preamble, the receive machine MUX 146 shown in FIG. 14 receives the message from each bus 1, 2. The receive machine MUX 146 receives a clock signal RXCLK (twice the bit time of the Manchester encoded data signal) synchronized with the data received from each bus. The receive machine MUX 146 is responsive to the transmitter busy signal (TM_BUSY) because the MUX 146 cannot switch from one bus to the other bus while the transmitter is busy without a risk of causing phase errors between RXCLK1 and RXCLK2.

Within the MUX 146, preambles 1, 2 from the buses 1, 2 are compared 148 with identical stored ideal preambles. If both preambles 1, 2 compare favorably with the stored preamble, the MUX does not switch from the bus presently selected for providing the message. If neither preamble compares favorably with the stored value, there is a transmission error. If the preamble from the bus presently selected in switch 150 for output from the MUX 46 does not compare favorably with the stored preamble, the other bus is selected for providing the message to a parallel to serial converter 152 of the RM 114 if its preamble compares favorably with the ideal preamble.

Figure 15:
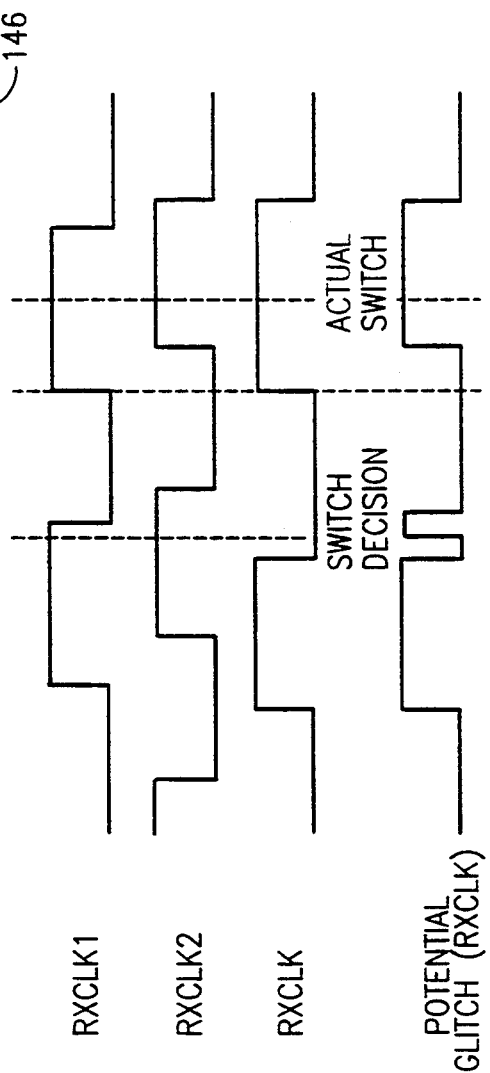
FIG. 15 is a diagram of the timing of bus switching in the multiplexer of FIG. 14.

FIG. 15 shows the timing RXCLK1 with respect to RXCLK2 during the switch from the bus 1 clock to the bus 2 clock. The switching from bus 2 to bus 1 is similar. Because the sampling takes place at the half point of each bit of the Manchester encoded message, the switch from bus 1 to bus 2 takes place within one quarter of the bit time. In this way, the switch takes place before the next bit in the data stream; here, a bit of the sender ID. In sum, the MUX 146 switches from one bus to another based upon the preamble so that the message provided to the parallel to serial converter has a greater likelihood of being error-free. The output of RXCLK of the MUX 146 follows RXCLK1 prior to the switch decision, at which point an invalid preamble on bus 1 is detected. If the switch were made at this point, a glitch would result in the MUX output RXCLK. Therefore, the switch is actually made later when both inputs RXCLK1, 2 are in the same state and have remained in this state for at least a minimum but not a maximum time so that the switch takes place near the center of a clock pulse of both clock signals RXCLK1, 2. To this end, the MUX 146 is responsive to a minimum time, a maximum time, and the clock signals RXCLK1, 2. By switching near the center of a pulse from both clock signals RXCLK1, 2, a glitch is avoided.

Figure 16:
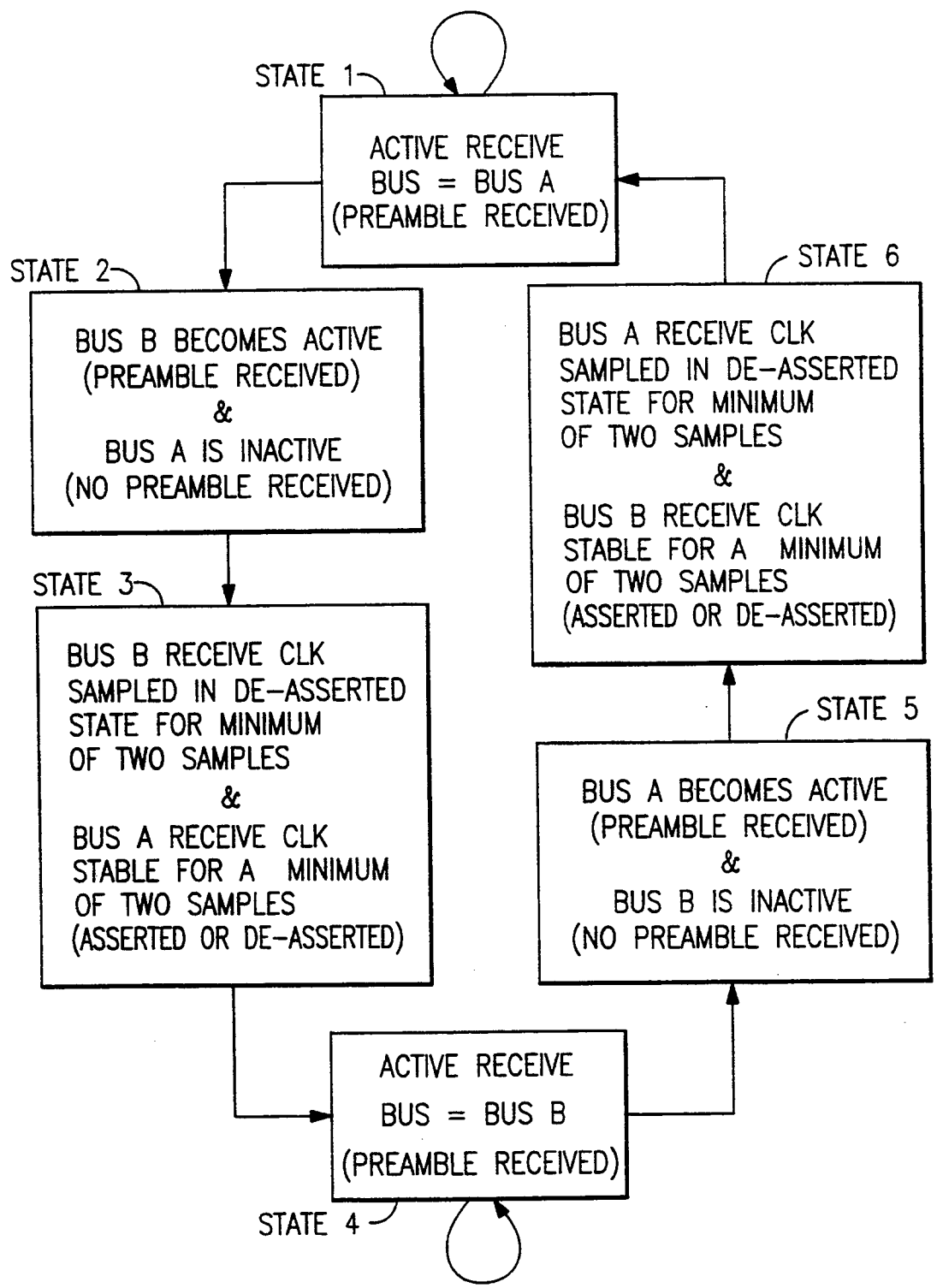
FIG. 16 is a state diagram of the multiplexer alternative to that of FIG. 14.

FIG. 16 is an alternative illustration of the bus switching scheme shown in FIGS. 14 and 15, in a state diagram. In state 1, the RM 114 has bus 1 as the active bus from which messages are taken. In state 2, bus 2 is active because a preamble is received from it. In state 2, no preamble is received from bus 1. In state 3, bus 2's receive clock signal is sampled in a de-asserted state for at least two samples and the receive clock for bus 1 is sampled for at least two samples (whether in the de-asserted state or in the asserted state). Then, in state 4, bus 2 is the active bus from which messages are received. States 5 and 6 are similar to states 2 and 3.

Returning to FIG. 10, when the RM 114 receives a message identifier (MID) byte within RXD1 or 2 (depending on which was selected by the circuit of FIG. 8) for determining if the RM 114 wants to accept a message, the RM 114 provides an MID request signal (RM_MIDREQ) to an MID lookup table in the ALI 104 for requesting that the MID byte in the received message be compared against the MID byte stored in the receiving CC 102. In response to the RM_MIDREQ signal, the ALI 104 provides an AL_MIDACK signal for acknowledging receipt of the MID request, and the RM 114 clears RM_MIDREQ. The RM 114 then provides an RM_MIDADR signal to the ALI 104 for locating the MID byte stored for the receiving node. If the MID of the message matches that for the receiving CC 102, the ALI 104 provides an RM_MID signal to the RM 114.

If the RM 114 is part of a bus controller (not shown), the RM 114 sends a message status byte (RM_MGSTAT) to the ALI 104. The message status byte is used to inform the AL 106 as to which protocol bytes (MID, LA, BA) match conditions set within the CC 102 so that a bridge (not shown) for connecting a group controller to a car controller can determine if an accepted message is for itself or is to be passed on to the next bus layer, for example, from a group control bus 2 or car control bus. A local address (LA) is an address directed to host processors local to a bus. A bus address (BA) is the address of a bus remote from the transceiver sending or receiving the message. The message status byte RM_MSGSTAT is illustrated in FIG. 8 A match is indicated by setting the associated bit to logic level 1.

A full receive machine buffer interrupt AL_INT will be generated to the AL 106 if the receive buffer 160 is full.

After the ALI 104 responds to the RM 114 with an AL_RMMID signal for indicating a match, the RM 114 provides an RM_BYTCNT signal to the ALI 104 for indicating the number of bytes in the message and then provides the message itself, RM_ALDAT signal.

Figure 17:
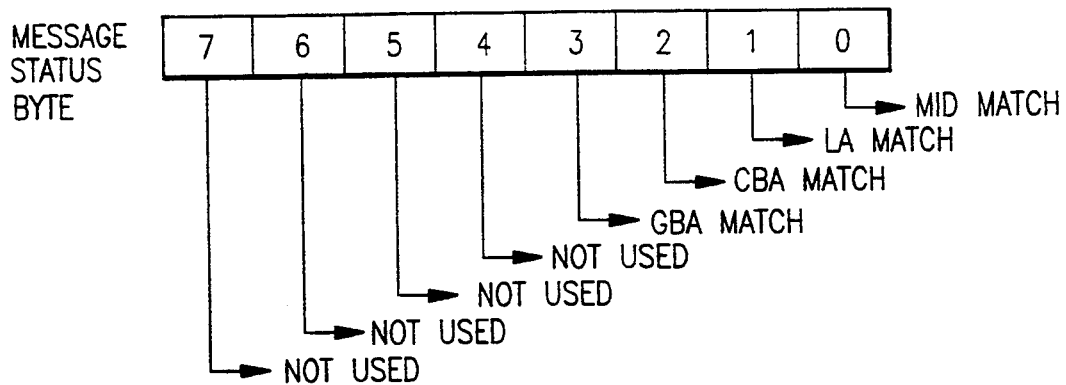
FIG. 17 is a bit map of the message status byte.

The value of the CB within the data signal RM_ALDAT instructs the RM 114 on the type of protocol bytes that exist within the packet and what conditions need to be met for the packet to be accepted at the node. Acceptance conditions differ between nodes depending on their location/function within the system. The conditions are pointed out in the table in FIG. 18. FIG. 17 shows the message states byte.

FIG. 18 shows a table listing the conditions for acceptance of a packet by the RM 114. The RM 114 provides a valid message signal RM_VALDMSG to the AL 106 if the conditions are met. If the conditions are not met, the message is discarded. FIG. 9 shows node type for nodes of bus controllers. A node in a bus controller (not shown) is of one of four types: (a) for sending messages from a car bus to a group bus, (b) for sending messages from a group bus to a car bus, (c) for sending messages from a group bus to a building bus, or (d) for sending messages from a building bus to a group bus. Each message sent to a RM 114 has a control byte shown in Column 2.

Depending upon the node type and presence of certain bits within the control byte, acceptance conditions must be met for a message to be accepted at a node.

In case A, if neither the bus address nor the local address is present, the MID byte in the packet must match that stored in the CC 102. In case B, if the local address bit is in the control byte, but the bus address bit is not, the value of the local address bit and MID byte must match the local address bit and MID byte, respectively, stored in the CC 102. In case C, if the bus address bit but not the local address bit is in the CC 102, the group bus address (GBA) and car bus address (CBA) must match the GBA and CBA stored in the receiving CC 102. In case D, if both the bus address and local address bits are in the control byte, the GBA, CBA, local address, and MID values must match the corresponding values stored in the receiving CC 102. Cases A-D show the conditions required for acceptance of a message at a generic node as opposed to a node residing in a bridge (not shown).

Therefore, in case E, if a node is a car to group node for passing messages in the up direction, and the bus address bit is in the control byte, but the GBA nibble in the message does not match that in the CC 102, the message will be accepted. In case F, if the car to group copy bit is present in the control byte, the message will not be accepted at a node for passing messages from the car bus to the group bus. In case G, if the bus address bit in the control byte is set and the GBA and CBA match the corresponding values in the CC 102, the message will be accepted at a bridge (not shown) for passing messages from the group bus to the car bus. The GBA must match to show which group bus and car bus have a match such that the car bus that wants the message gets it. In case H, if the bus address bit is in the control byte, but the GBA does not match the value stored in the CC 102, the message will be accepted at a bridge for passing messages from the group bus to the building bus. The bus address is set, but did not match the value stored in the receiving CC 102 so the message is sent from the group bus (not shown) to the building bus (not shown). In case I, if a group to building copy bit is set, a message will be accepted at a bridge for passing messages from the group bus to the building bus (not shown). In case J, if the bus address bit is set in the control byte and the GBA matches the value stored in the CC 102, the message will be accepted at a bridge (not shown) for passing messages from the building bus (not shown) to the group bus (not shown).

If the message has no errors in it, the RM 114 provides an RM_VALMSG signal to the ALI 104 indicating that a valid message has been transmitted. Receipt of a phase error or postamble anytime during packet processing will cause the valid message signal RN_VALMSG to not be set, causing the AL 106 to discard the message.

In FIG. 10, for EC 112, the RM 114 provides RM_RXCLK, RM_POSTAM, RM_PHERR, RM_EDGE, RM_JAM, and RM_TXCLK to the error control. RM_EDGE, RM_JAM, and RM_TXCLK for determining if the bus is busy or idle, and for counting the number of slots that have passed. The ST 110 provides ST_TMGO to tell the TM 108 that the TM 108 may transmit and an ST_IDLE signal to tell the TM 108 that the bus is idle and the TM 108 must jam the bus prior to sending a message. The ST 110 receives TM_CPT so that it can count slots until the TM's slot is available. The ST 110 receives the priority signal AL_TMPVAL so that ST_TMGO can tell the TM 108 to transmit a priority level signal from the AL 106 in a priority slot (as opposed to a rotating slot). The rotating slot a message is sent in is determined by the nodes SENDER_ID. But if AL_TMPVAL is set, the SENDER_ID is ignored, and the priority value of AL_TMPVAL is used to determine which priority slot the message will be transmitted in.

Figure 19:
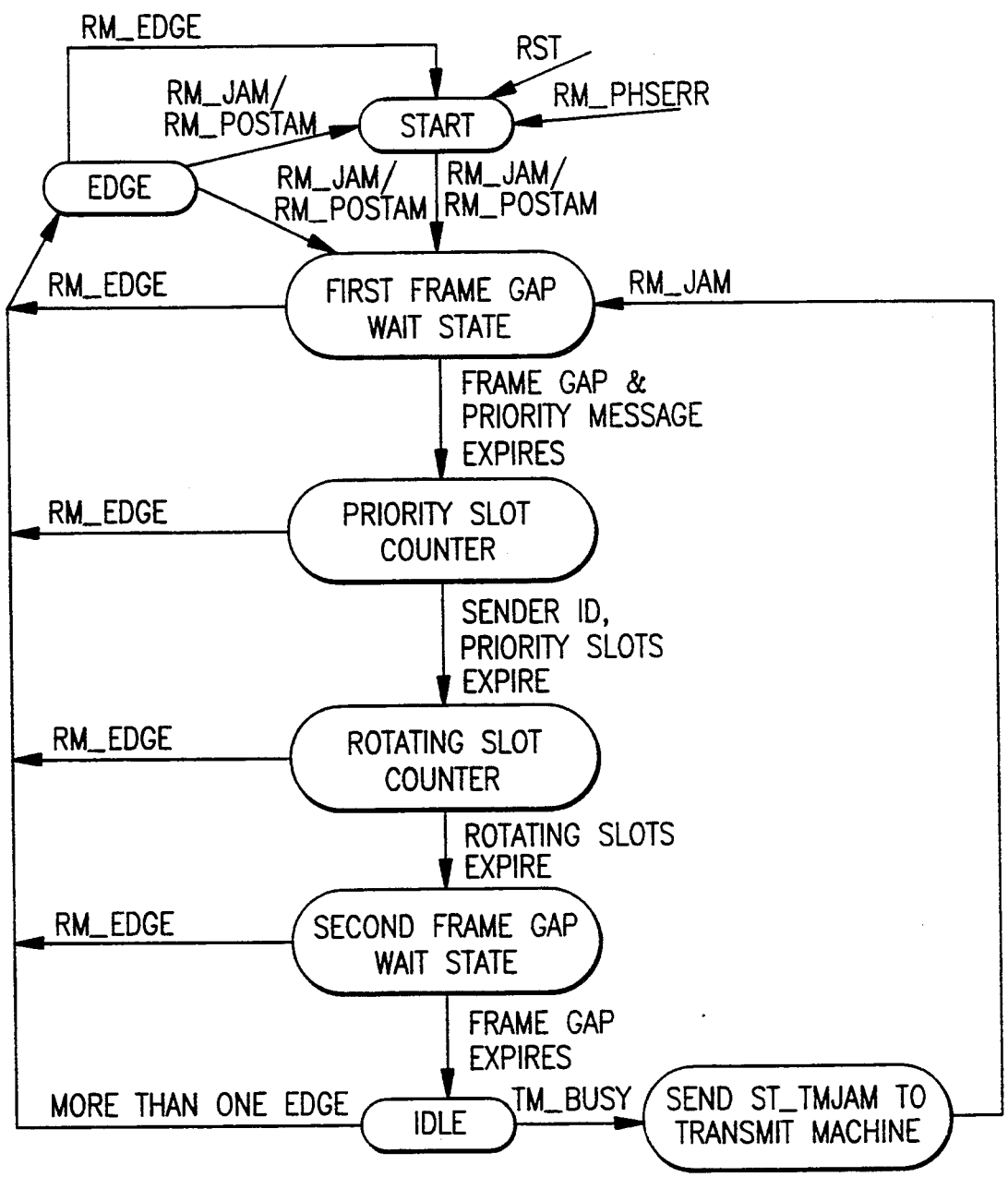
FIG. 19 is a state diagram of the operation of a slot timer.

The function of the ST 110 is illustrated in the finite state machine of FIG. 19. When the ST 110 receives a reset signal (RST) or power-up signal or a phase-out RMPHERR (provided from the RM 114 when the Manchester encoded received signal includes two adjacent half-bits of the same polarity), the ST 110 is in the START state. In the START state, a first frame gap timer starts. If the ST 110 receives a jam signal, RM_JAM, from the RM 114 and a postamble signal, RM_POSTAM, the ST 110 enters a FIRST FRAME GAP WAIT STATE. If the first frame gap time expires and the TM 108 has a priority message to transmit as indicated by a non-zero priority signal ALTMPVAL, then the ST 110 enters a PRIORITY SLOT COUNT STATE. In the PRIORITY SLOT COUNT STATE, the ST 110 counts up to a number of priority time slots equal to the value in the priority signal, ALTMPVAL. When the ST 110 has counted so high, the ST 110 provides a signal ST_TMGO to the TM 108 for telling the TM 108 that its slot on the bus is currently available. If the first frame gap expires, but the TM 108 has no priority message to send as indicated by a zero value, ALTMPVAL, the ST 110 enters a ROTATING SLOT COUNT STATE. The ST 110 also enters the ROTATING SLOT COUNT STATE if all the priority slots expire and the ST 110 receives a sender ID signal RMSID from the RM 114. In the ROTATING SLOT COUNT STATE, the ST 110 counts the rotating slots expiring on the bus, by means of RXCLK, until the number of expired rotating slots equals a rotating slot value stored in the ST, at which point the ST 110 provides the signal ST_TMGO to the TM 108 for telling the TM 108 that its slot is available. The ST 110 needs the SENDER ID of the CC 102 most recently transmitting so that the ST 110 may count the slots until the counted slots reach the stored rotating slot value. Thus, if a TM 108 with sender ID of 7 learns that the TM 108 with sender ID of 3 just transmitted, the TM 108 will count three rotating slots. The ST 110 need not know the sender ID of the last transceiver providing a priority message onto the bus because the priority messages are assigned to fixed, not rotating, slots. After expiration of all rotating slots, the ST 110 enters a second frame gap state for waiting for a frame gap to expire. After expiration of the second frame gap, the ST 110 goes idle. If the ST 110 receives a TM_BUSY signal, the ST 110 provides a ST_TMJAM signal to the TM 108. When the ST 110 receives RM_JAM, the ST 110 returns to the FIRST FRAME GAP WAIT STATE.

If the ST 110 receives an edge signal, RM_EDGE, while in the START state, the ST 110 enters an EDGE state and waits until the ST 110 receives RM_JAM and RM_POSTAM, at which point the ST 110 enters the FIRST FRAME WAIT STATE or the ST 110 detects that both RM_JAM and RM_POSTAM are inactive, at which point the ST 110 enters the START state.

If the ST 110 receives an edge signal while in any state, but the IDLE state, the ST 110 enters the EDGE state. If the ST 110 receives more than one edge during the IDLE state, the ST 110 enters the EDGE state.

The EC 112 detects several errors in transmission and reception. The EC 112 detects a Lost Carrier Sense error in response to a TM_BUSY signal and several RM_EDGE signals within a short period. The EC 112 detects a CRC Error Following Transmission in response to a TM_BUSY signal, an RM_CRC signal, and an RM_POSTAM. The EC 112 detects that a transmission was completed without a CRC error in response to TM_BUSY, RM_CRC, and RM_POSTAM. The EC 112 detects that no jam was detected at the jamming node and responds to ST_TM-JAM and RM_JAM. The RM 114 detects a CRC error during message reception and responds to the RM_CRC signal and the RM_POSTAM signal. The EC 112 detects a phase error with a CRC error during reception and responds to an RM_PHERR signal and RM_CRC signal, and RM_POSTAM signal. The EC 112 detects a partial message reception in response to the RM_PHERR phase error signal. The EC 112 detects that a valid message was received and responds to the RM_CRC signal and the RM_POSTAM signal.

Figure 20:
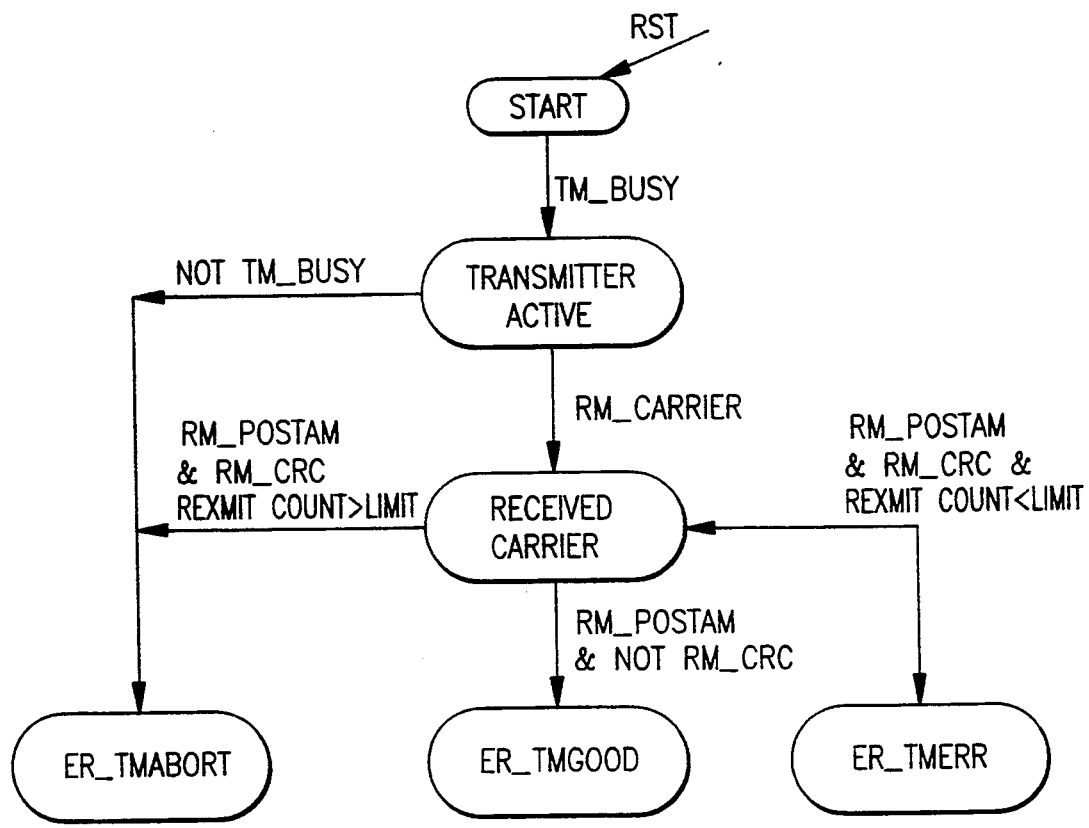
FIG. 20 is a state diagram of the operation of the error control.

FIG. 20 shows a state diagram for generating ER_TMABORT, ER_TMGOOD, and ER_TMERR. After the EC 112 is started and receives TM_BUSY, the EC 112 enters the TRANSMITTER ACTIVE state. If the EC 112 receives RM_CARRIER, a signal for indicating that the RM 114 has received several RM_EDGE signals in a short time, the EC 112 enters the RECEIVED CARRIER state. If EC 112 then receives RM_POSTAM and RM_CRC, the transmission is assured to be good and the EC 112 provides ER_TMGOOD to the TM 108. If the EC 112 receives RM_POSTAM and RM_CRC and a retransmission counter (for counting the number of times a message is retransmitted) has counted beyond a limit, the EC 112 tells the TM 108 to abort the transmission using an abort signal ER_TMABORT. If, while the EC 112 is in the RECEIVED CARRIER state, the EC 112 receives RM_POSTAM and RM_CRC and the retransmit counter has not exceeded the limit, the EC 112 tells the TM 108 that an error has occurred with ER_TMERR. If while the EC 112 is in the TRANSMITTER ACTIVE state, the EC 112 senses that TM_BUSY has been turned off, then the RM 114 never got a carrier signal (several RM_EDGEs) from either bus and the transmission is aborted. If the EC 112 receives RM_CARRIER for a period of time and TM_BUSY is off for that period, the EC 112 provides ER_RXENB to the RM 114 to tell it that messages may be received on buses 1, 2.

It should be understood by those skilled in the art that various changes, omissions, and additions may be made herein without departing from the spirit and scope of the invention.

We claim:

1. An elevator communications unit for use in an elevator communication system which includes a plurality of said communication units distributed among a building bus, a group bus, and a car bus, comprising:

A transceiver machine responsive to a data signal in parallel form provided from an applications layer for converting said data signal from parallel form to serial form and providing a serial data signal onto a dual bus of said elevator communications system wherein said data signal is precede on said dual bus by a control byte signal for identifying whether communications of the data signal are local to the dual bus or directed to a remote bus (group or building), a message identifier signal, and a preamble signal, and a bus jam signal if said data signal is being provided onto an idle dual bus;

a receive machine responsive to said serial data signal on said dual bus for converting said data signal from serial form to parallel form, for selecting only one data signal from one bus based on said preamble, for identifying said data signal as associated with the bus of said receive machine by means of said control byte, and providing said data signal to said applications layer when the message identifier signal of the received data signal for matches with a message identifier signal associated with said applications layer;

a slot timer for timing the transmission and reception of said data signals by said communication unit.

* * * * *